United States Patent [19]

Parnum et al.

[11] 4,373,301
[45] Feb. 15, 1983

[54] CAM MACHINING

[75] Inventors: John D. Parnum, Netherton; Nigel T. Barber, Rugby, both of England

[73] Assignee: The Newall Engineering Company Limited, Peterborough, England

[21] Appl. No.: 79,700

[22] Filed: Sep. 28, 1979

Related U.S. Application Data

[62] Division of Ser. No. 926,384, Jul. 20, 1978, abandoned.

[30] Foreign Application Priority Data

Jul. 26, 1977 [GB] United Kingdom ............... 31406/77

[51] Int. Cl.³ ............................................. B24B 1/00
[52] U.S. Cl. .................................. 51/281 C; 51/101 R; 51/165.71
[58] Field of Search .......... 51/101 R, 165 TP, 165.71, 51/281 C; 90/13.4; 82/19

[56] References Cited

U.S. PATENT DOCUMENTS

| | | | |
|---|---|---|---|
| 3,344,559 | 10/1967 | Inaba | 51/165 TP |
| 3,693,297 | 9/1972 | Cann | 51/101 R |
| 4,005,551 | 2/1977 | Lines | 51/101 R |
| 4,005,552 | 2/1977 | Hoglund | 51/101 R |
| 4,102,082 | 7/1978 | Katsumi | 51/101 R |
| 4,122,634 | 10/1978 | Nishimura | 51/165.71 |
| 4,197,679 | 4/1980 | Yamada | 51/281 C |

Primary Examiner—Harold D. Whitehead
Attorney, Agent, or Firm—Watson, Cole, Grindle & Watson

[57] ABSTRACT

The invention provides apparatus and a method for use in machining cam profiles, and is suitable for use in grinding, milling, turning or otherwise forming cams. A workpiece, i.e. a cam blank, is rotated adjacent a machine tool (e.g. a grinding wheel) and is moved relative thereto laterally of its axis of rotation so that stock is removed from the workpiece to form a predetermined cam profile thereon. At the same time, the angular displacement of the workpiece relative to a datum is continuously monitored and the rotational speed of the workpiece is varied in dependence on its instantaneous angular displacement so that the stock can be removed at a substantially constant rate, preferably defined by a predetermined programme corresponding to the particular cam profile to be machined on the workpiece.

9 Claims, 11 Drawing Figures

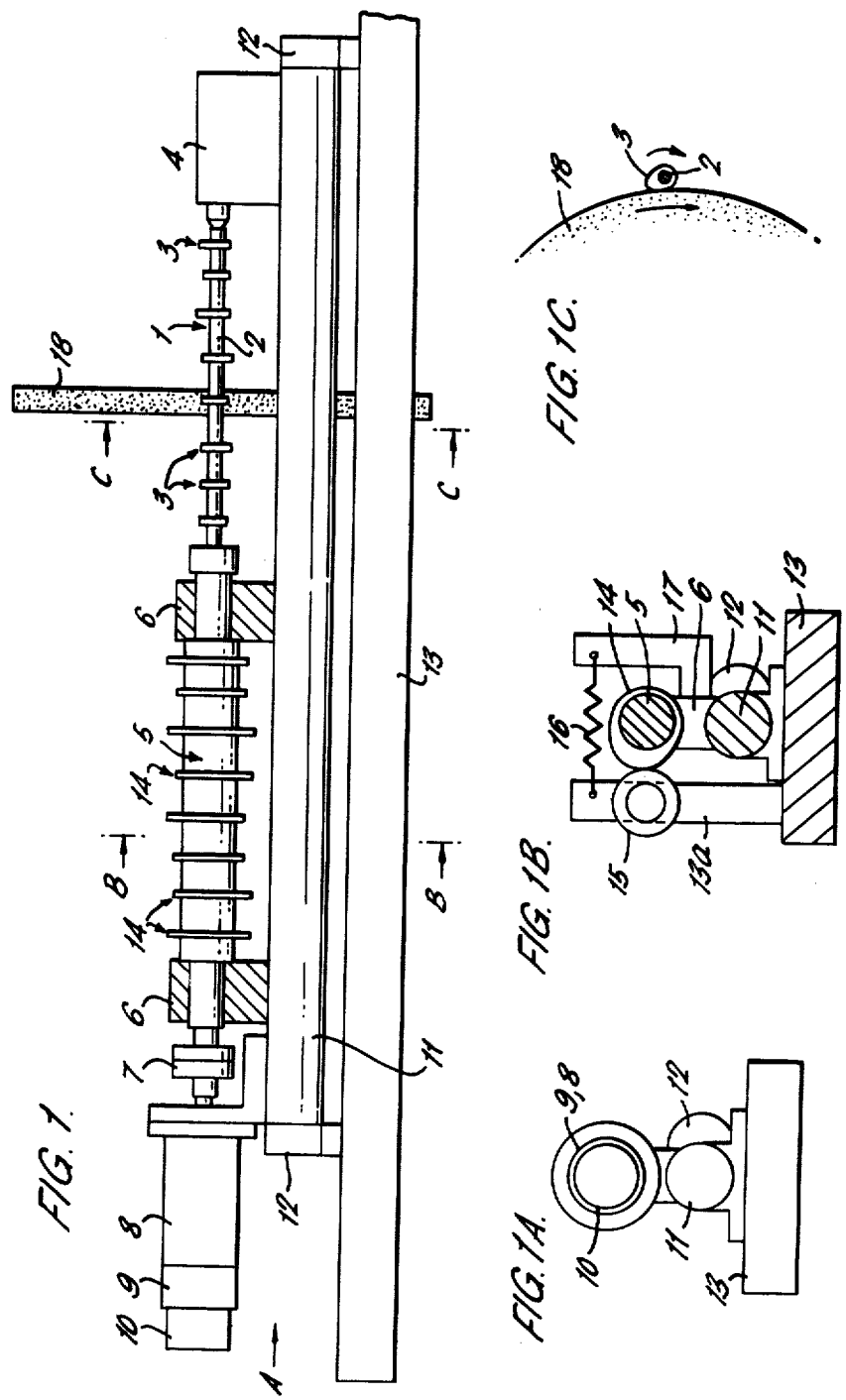

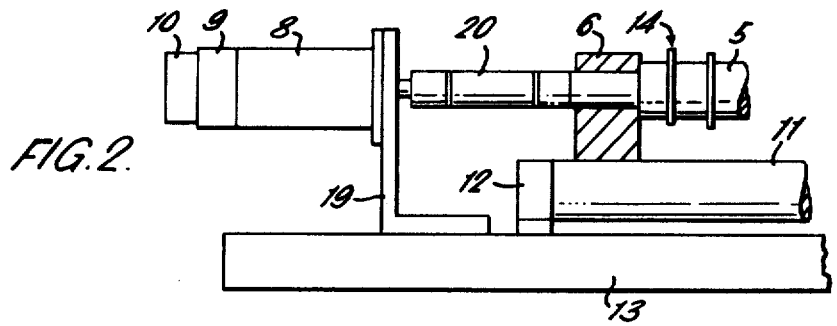
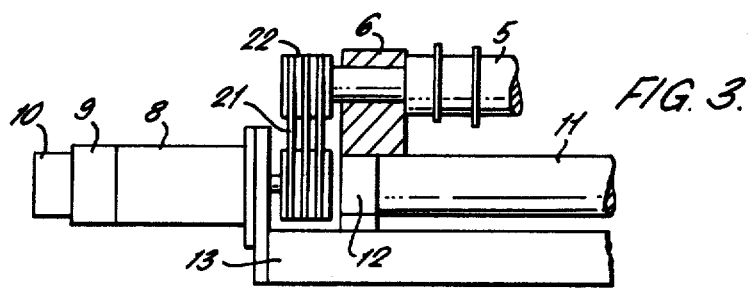
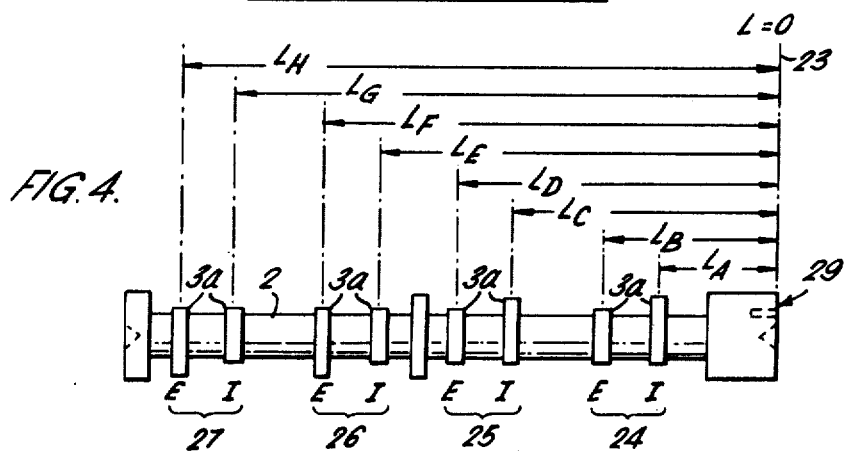
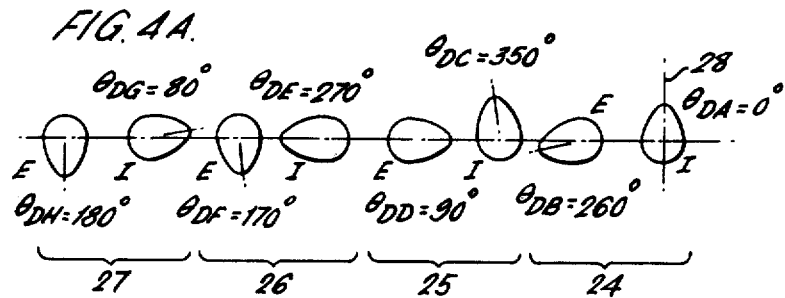

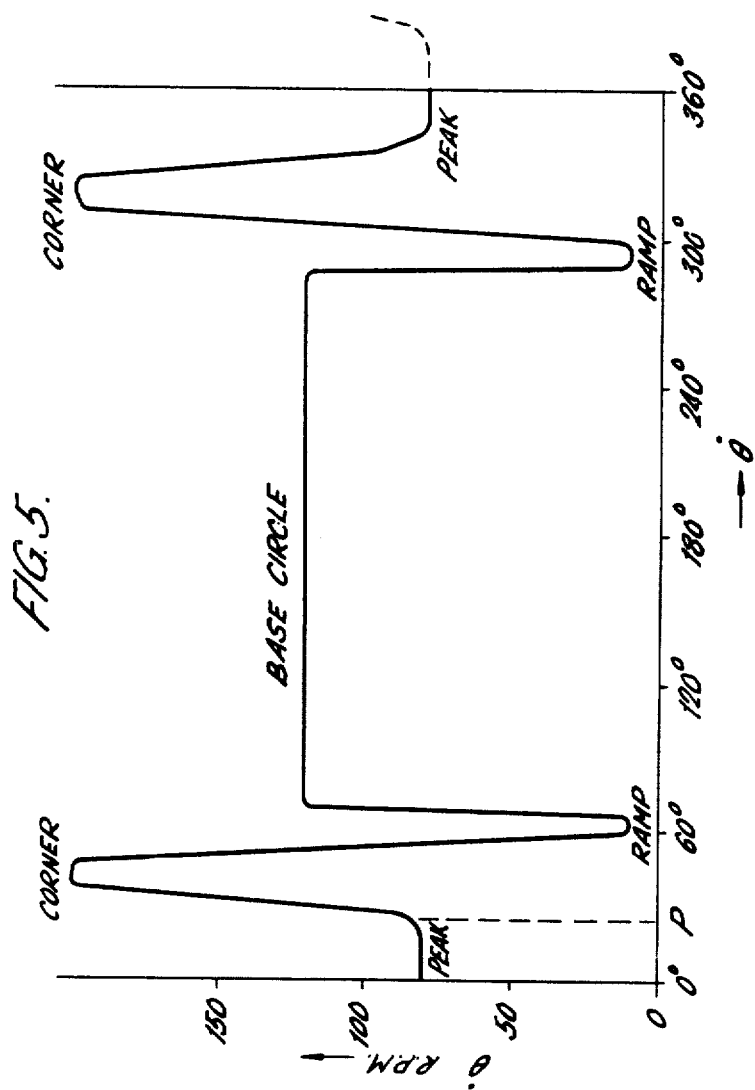

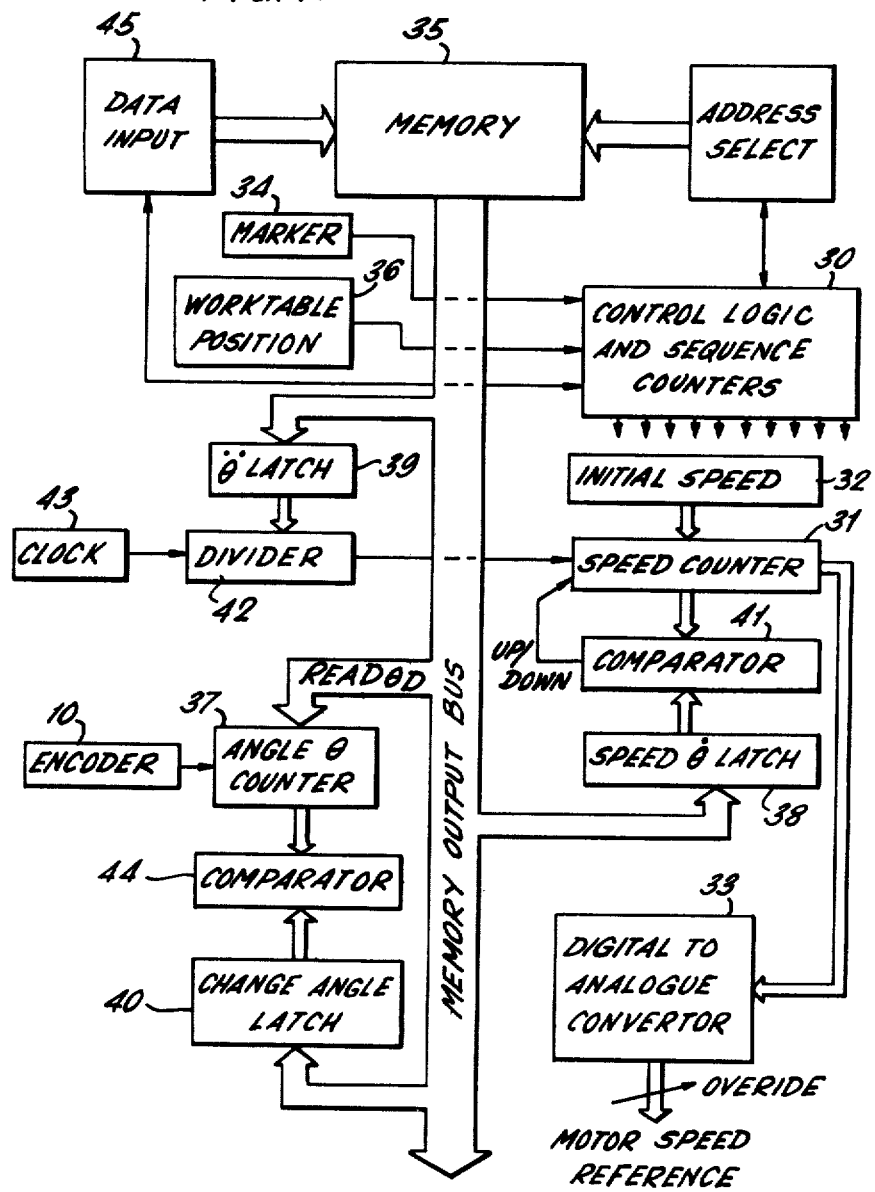

CAM MACHINING

This is a division of application Ser. No. 926,384, filed July 20, 1978, and now abandoned.

FIELD OF INVENTION

The invention relates to machine tools, and in particular those for grinding, milling, turning or forming cams.

BACKGROUND OF INVENTION

When the workpiece on such a machine is rotated at a constant angular speed in order for the tool e.g. grinding wheel to form the required profile, the stock removal rate and surface finish may vary according to the profile cut and tool or grinding wheel geometry.

In the particular, though not exclusive case, of a camshaft grinding machine, the problem is particularly acute as detailed below.

FIG. 6 of the accompanying drawings shows a cam profile 127 being ground by grinding wheel 18. Normally the cam is rotated at a constant angular speed $\theta$. This results in large variation of linear speed V of the profile past the wheel. The geometry of the wheel and cam effect the following ramp 121 is 17% of the length of the cam profile, yet is ground during only 5° of cam rotation, or 1.4% of the total angular rotation. If base circle 120 is taken as a linear speed of unity then ramps 121 and 125 have linear speeds up to thirty times the base circle while corners 122 and 124 may be one third of the base circle speed. As stock removal rate is directly proportional to the linear speed of the profile past the wheel then if the cam is rotated at constant angular speed the stock removal rate will vary considerably.

In order to achieve constant stock removal rate, therefore, the angular speed of the cam should be varied as the cam rotates such that the linear speed V is constant. For a typical cam profile as shown, $\theta$ will be constant while the base circle 120 is ground, the ramps 121 and 125 require $\theta$ to be reduced by up to thirty times, peak 123 requires a reduction of up to one and a half times, and corners 122 and 124 require $\theta$ to be up to three times greater than base circle $\theta$.

SUMMARY OF INVENTION

According to one aspect of the present invention, there is provided apparatus for machining cam profiles, comprising mounting means for rotatably holding a workpiece whilst a cam profile is being machined thereon, drive means for rotating a workpiece held by the mounting means; a machine tool for removing stock from a portion of a rotating workpiece held by the mounting means; profile control means for providing relative movement between the machine tool and the mounting means laterally of the axis of rotation of the workpiece during the removal of stock from the workpiece portion so that a predetermined cam profile is machined thereon; and speed control means for controlling the operation of the drive means to rotate the workpiece during the machining of the cam profile at varying speeds depending on its instantaneous angular disposition relative to a datum about its axis of rotation so that stock can be removed from the workpiece portion at a substantially constant rate.

The drive means may, for example, be electrical, whether DC or AC operated, or it may be hydraulic or mechanical. The drive means may be coupled to the workpiece to rotate the latter by any suitable means, for example, by a direct coupling, via a universally jointed shaft, or via a mechanical drive belt or belts or a gear mechanism.

The instantaneous angular disposition of the workpiece during machining may be determined by a feedback device, for example, an incremental or digital encoder, or a resolver or synchro (selsyn).

The apparatus according to the invention may be further adapted to machine a workpiece, such as a camshaft, having a number of cam profiles spaced along its length, whether the cam profiles to be machined on each cam are each determined individually or classified into groups. In this instance, the mounting means for the workpiece is arranged to be longitudinally moved, i.e. indexed, between each machining operation to bring successive cams into position for machining; means are therefore provided for determining the longitudinal position of the workpiece, for example by positive identification of the position of the mounting means by coded signals generated each time a cam registers with the machining means, there being preferably some means for providing a parity check of the longitudinal measurement codes, or by counting longitudinal stepwise movements of the mounting means from a start or datum position.

The information relating rotational speed and acceleration to angular disposition for an individual cam profile, for groups of identical cam profiles on one workpiece or for cam profiles on the workpieces of a group are preferably stored in a memory as required, using either digital or analogue stores or a mechanical memory.

The invention is particularly, but not exclusively, concerned with the machining of cam profiles using a grinding wheel.

According to another aspect of the invention, there is provided a method of machining a cam profile on a workpiece comprising the steps of rotating the workpiece adjacent a machine tool, producing movement of the workpiece relative to the machine tool in a lateral direction with respect to the axis of rotation of the workpiece so that the machine tool removes stock from the workpiece to form a predetermined cam profile thereon, continuously monitoring the angular displacement of the workpiece relative to a datum during the formation of said cam profile, and varying the rotational speed of the workpiece in dependence on the instantaneous angular displacement so that the stock can be removed at a substantially constant rate.

The invention is also concerned with a workpiece on which a cam profile or profiles, e.g. a camshaft, is or are produced using the apparatus or method described above as being according to the invention.

BRIEF DESCRIPTION OF DRAWINGS

FIG. 1 is a diagrammatic view of a grinding machine according to one embodiment of the invention in which the motor is directly coupled to the gangmaster, the operative connection between the rockable table and the gangmaster being omitted for clarity;

FIG. 1A is a diagrammatic end view of the machine of FIG. 1 seen in the direction of arrow A;

FIG. 1B is a diagrammatic sectional view taken along the lines B—B of FIG. 1, which shows the operative connection between the rockable table and the gangmaster;

FIG. 1C is a diagrammatic part-sectional view taken along the lines C—C of FIG. 1;

FIG. 2 is a diagrammatic view of a modification of a part of the grinding machine of FIG. 1;

FIG. 3 is a diagrammatic view of a second modification of the machine of FIG. 1;

FIGS. 4 and 4a show a typical workpiece, i.e. camshaft, illustrating the axial and angular dispositions respectively of the cams thereon;

FIG. 5 shows a typical graph of rotational speed/cam angle profile to provide $V_{CONST}$, hereinafter referred to as the speed programme;

FIG. 7 shows a block diagram of one example of control system according to the invention.

DETAILED DESCRIPTION OF PREFERRED EMBODIMENTS OF INVENTION

Figure 6:
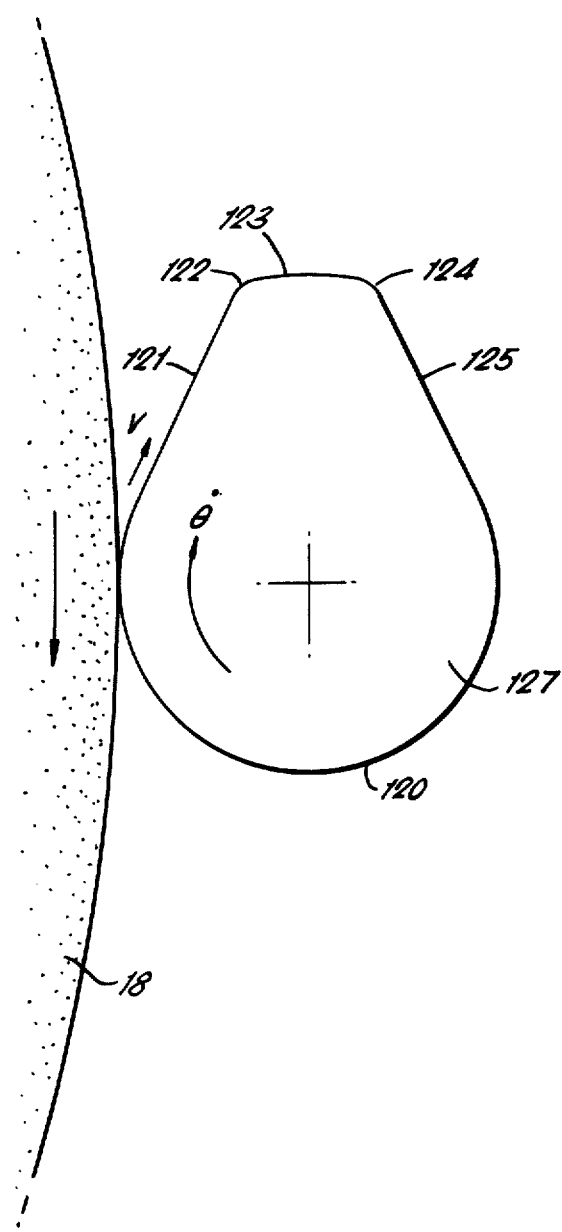
FIG. 6 shows a typical cam profile.

Referring to FIGS. 1, 1A, 1B and 1C, there is shown a camshaft grinder table assembly constructed for the most part in a known manner. The workpiece 1 comprising a camshaft 2 which may have any number of cam blanks 3 which are to be ground to form respective cams spaced apart along it, is supported at one end by a tail stock 4 and at the other end on a centre taper on the end of a gangmaster 5. The other end of the gangmaster 5 is coupled via a torsionally stiff coupling 7 to a motor 8, which is in turn coupled to a tachometer generator 9 and an incremental encoder 10. The tail stock 4, bearing pedestals 6 and motor 8 are all mounted on a rockable table 11, which is supported by pivots 12 on a table 13.

The motor 8 may conveniently be of inverted armature construction.

The gangmaster 5 has a number of master cams 14 spaced apart along its length, the profile of each master cam 14 being such that, as described below, it enables the grinding of a required profile on a respective one of the cam blanks 3 on the workpiece. When the grinding of a particular one of the cam blanks 3 on the workpiece takes place, the gangmaster 5 is positioned so that a respective one of the master cams 14 thereon is positioned adjacent to a roller 15 (FIG. 1B) which is rotatably mounted for rotation about a fixed horizontal axis on an upstanding member 13a attached to the table 13. The chosen master cam 14 is held in contact with the roller 15 by means of a spring 16, or other suitable, compliant loading device, which extends between the member 13a and a projection 17 of the rockable table 11 or an attachment thereto. Thus when the motor 8 is operated to rotate the gangmaster 5 in synchronism with the camshaft 2, the profile of the chosen master cam 14 bearing against roller 19 imparts a rocking motion to the rockable table 11 so that it laterally displaces the axis of the camshaft 2 with respect to the axis of a grinding wheel 18 disposed adjacent the respective cam blank 3 to be ground on the workpiece, according to established practice. The master cams 14 on the gangmaster 5 are conveniently related to the respective cam profiles to be ground on the workpiece in any suitable manner, the table 13 and thus the components mounted thereon being moved longitudinally, with respect to the grinding wheel, after each grinding operation in order to prevent a different cam blank 3 on the camshaft 2 to the wheel 18 in readiness for a subsequent grinding operation, whilst the roller 15 is simultaneously moved via a gear train (not shown) until it registers with the master cam 14 corresponding to the cam profile to be ground on the new cam blank now being registered with the grinding wheel.

FIG. 2 shows an alternative form of the camshaft grinder table assembly shown in FIG. 1, in which the mass of the motor assembly 8, 9 and 10 is no longer carried on the rockable table 11, but is mounted rigidly on the work table 13, by means of a bracket 19. In this instance, the motor 8 is operatively connected to the gangmaster 5 in order to rotate the gangmaster and workpiece conjointly by means of a universally jointed shaft 20.

FIG. 3 shows yet a further alternative modification to the assembly of FIG. 1, in which the motor assembly 8, 9 and 10 is mounted on the work table 13 in such a way that it is coaxial with the pivots 12 of the rockable table 11. In this case, the motor 8 is operatively connected to rotate the gangmaster and workpiece conjointly by means of a belt or belts 21 passing around a pulley or pulleys 22 on the end of the gangmaster 5. A further variation of this modification would be to mount the motor assembly in a similar position but on to an extension of the rockable table 11, in order to avoid superposing the rocking table motion onto the belt or belts. A suitable gear assembly could be used as an alternative to the belt or belts 21.

There are two alternative means of programming a suitable memory with the required speed/angle programmes for producing a camshaft having more than one cam thereon. Either the speed programme for each cam may be programmed into the memory separately and related to a suitable datum so that each cam profile is ground individually, or, if the same profile is repeated for more than one cam, as is frequently the case with, say, camshafts for use in internal combustion engines or compressors, the programme stored in the memory for each type of cam may be related to a cam datum, and the stored locations of the various cam data related to a camshaft datum The camshaft datum is in turn related to a machine datum by means of a suitable locating device. FIG. 4 shows a side view of a typical ground workpiece comprising a camshaft 2 and a plurality of cams 3a formed from the respective cam blanks 3, spaced therealong. The axial locations of the various cams 3a are defined by respective dimensions $L_A$, $L_B$, $L_C$ etc., relative to a linear camshaft datum 23 (where $L=0$), which correspond to the indexing positions of the table 13. The eight cams 3a on the camshaft 2 are divided into four pairs 24–27, there being an inlet valve cam I and an exhaust valve cam E in each pair. As illustrated in FIG. 4A, the inlet and exhaust valves of each pair are displaced at various angles relative to an angular camshaft datum 28 which is defined relative to some physical characteristic of the camshaft, e.g. a keyway, or a dowel hole 29 at one end of the camshaft as indicated in FIG. 4.

The "speed programme" for a given cam relates the speed $\dot{\theta}$ and the angular displacement $\theta$ from its cam datum required to give a substantially constant value $V_{CONST}$ to the grinding speed V (FIG. 6). In this embodiment, the cam datum of a given cam, from which the angular displacement $\theta$ is measured, is defined as occurring when the centre of the highest lift portion of the cam is aligned with the centre line of the grinding wheel, at which point $\theta$ of course equals zero. As the workpiece rotates away from this cam datum its angular displacement $\theta$ reaches successive values where respective changes in the rotational speed of the workpiece are required to produce the desired cam speed profile, as identified by the particular speed programme. At each of these values of $\theta$, a new speed $\dot{\theta}$ and acceleration $\ddot{\theta}$ are read from the memory, being determined by the speed programme. The acceleration $\ddot{\theta}$ is used to control the rate at which the speed $\dot{\theta}$ is changed, as described below. At all times the speed reference in digital (i.e. binary coded decimal) form is fed to a digital to analogue converter (D.A.C.) to produce a varying speed reference voltage as described below. Since the cam datum for a given cam may be displaced from the angular camshaft datum 28 by a cam angle $\theta_D$, in this embodiment $\theta_{DA}$, $\theta_{DB}$, $\theta_{DC}$ etc., (see FIG. 4A), this cam angle $\theta_D$, as well as the respective axial dimension from the linear camshaft datum 23, is part of the programme for producing the complete camshaft as described hereafter.

A brief description of a typical grinding cycle for a workpiece now follows:

Initially, the wheelhead for the grinding machine is in the retracted position, i.e. the grinding wheel is rotating and the rockable table 11 is retracted away from the wheel. The workpiece to be ground is loaded into the workpiece supports and the grinding cycle is initiated. Providing that all functional and safety interlocks are satisfied, the wheelhead then advances to a "feed" position and the table 13 is advanced longitudinally through a prescribed distance so that the first cam blank 3 is brought into lateral alignment with the grinding wheel i.e. until the displacement L from the linear camshaft datum 23 (FIG. 4) equals $L_A$; at the same time the corresponding master cam 14 on the gangmaster is brought into lateral alignment with the roller 15. The memory is searched to determine from the displacement $L_A$ from the linear camshaft datum the correct speed programme for the grinding of a cam on this first cam blank 3, and the respective cam angle $\theta_{DA}$, and to derive the required rotational speed in a manner which will now be described with reference to FIG. 7, which illustrates one example of a control system for the invention in which control logic and sequence counters 30 control the remainder of the control system.

Initially a speed counter 31 is set to zero. To start the workpiece rotating at an arbitrary initial speed, arbitrary initial speed data from a suitable source 32 is loaded into the counter 31. This passes direct to the digital to analogue converter (D.A.C.) 33 to produce an output reference voltage proportional to the required arbitrary initial speed. The camshaft turns until a marker pulse 34 occurs denoting that the camshaft datum position (i.e. 28 on FIG. 4A) has been reached. At this point the memory 35 is searched for the cam angle $\theta_{DA}$ for this particular cam at this worktable position $L=L_A$. This axial displacement $L_A$ is sensed by suitable indexing detecting means 36. As stated above, the cam angle $\theta_D$ for each cam denotes the displacement of that cam's datum from the angular camshaft datum 28 (FIG. 4A) and represents the angle that the cam has covered since its outer cam datum (i.e. $\theta=0$) passed the grinding wheel centre. The appropriate cam angle $\theta_D$ is loaded into an angle counter 37 which is used as described below to monitor the value of $\theta$, because at this instant $\theta=\theta_{DA}$. At the same time, because $\theta=\theta_{DA}$ at the instant the memory is also able to furnish information regarding the stage of the speed programme for this cam corresponding to $\theta=\theta_{DA}$.

Using this information, the appropriate speed programme is searched for the speed $\dot{\theta}$ required at this stage in the speed programme, this speed $\dot{\theta}$ being loaded into a speed latch 38, the corresponding acceleration $\ddot{\theta}$ required for $\theta=\theta_{DA}$, which is loaded into an acceleration latch 39, and the required "change angle" (i.e. the next value of $\theta$ at which the speed programme dictates that a change of speed $\dot{\theta}$ is needed) which is loaded into a latch 40. A comparator 41 now detects the error between, i.e. the difference in output of, the speed counter 31 and the speed latch 38 and signals the counter 31 to count up or down till the output of counter 31 equals that of latch 38 and the motor is operated to rotate the workpiece at the required speed $\dot{\theta}$ set into the latch since the output of speed counter 31 is also supplied to the motor via the D.A.C. 33 as described above. The rate at which the counter 31 counts depends on the pulse rate out of a divider 42 which divides a clock frequency signal from clock 43 by the output of the acceleration latch 49, thereby varying the rate of change of the output of counter 31 and hence the acceleration of the workpiece.

Meanwhile, as the workpiece rotates, the encoder 10 passes pulses to the angle counter 37, each pulse representing an increment of angular displacement of the workpiece. Thus the counter 37 counts up as the workpiece rotates to monitor the correct value of the angle $\theta$ at any instant. When the respective outputs of the angle counter 37 and the "change angle" latch 40 are equal, i.e. $\theta$ is equal to the change angle this being detected by a comparator 44, this indicates that a change of speed is required, as for example at point P in FIG. 5. The comparator 44 is connected, by means not specifically illustrated, to the counters 30 which then operate to select the new data relating to the speed $\dot{\theta}$ and acceleration $\ddot{\theta}$ now required and the next "change angle" at which the speed again must change. This new data is fed to the respective latches 38, 39 and 40, and the process described above is repeated. When the value for $\theta$ in angle counter 37 reaches 360° it automatically returns to zero for the next revolution i.e. to repeat the speed programme. Each time the marker pulse 34 is read, the value of the appropriate cam angle $\theta_{DA}$ is re-entered into the angle counter 37 to prevent accumulative errors in the value of $\theta$ recorded there from the encoder 10. Alternatively the appropriate cam angle $\theta_{DA}$ could be checked against the value of $\theta$ given by the output of the counter 37 to avoid error, when the motor pulse 34 is read.

The logic and sequence counters 30 control all of the above, and in addition allow the loading of fresh data into the memory 35 from switches, keyboard, tape or other input device 45. It also allows any individual part of the programme to be amended as required.

The output of the D.A.C. 33 is a signal of which the voltage is proportional to the speed required; the motor drive system "follows" this motor speed reference using well-known techniques. An overall speed override can be used to "scale" the motor speed reference e.g. to allow for variations in wheel or component materials.

At sparkout, i.e. when the desired cam profile is ground on the first cam blank 3, the rockable table 11 is retracted from the grinding wheel and the table 13 is indexed longitudinally until the next cam blank 3 is brought into lateral alignment with the grinding wheel (i.e. $L=L_B$), and its corresponding master cam 14 on the gangmaster is brought into lateral alignment with the roller 15. At this time, the memory is again searched to determine the new cam speed programme appropriate to the second cam, and the respective cam angle $\theta_{DB}$ (which equals $\theta$ at this instant in time) and the new required speed $\dot{\theta}$ acceleration $\ddot{\theta}$, and "change angle" are derived. This process is repeated for each cam blank 3 on the workpiece.

If necessary the memory may be programmed so that, once all the cam blanks 3 on the workpiece have been ground to the desired cam profiles, that is to say at the end of the whole grinding cycle where $L=L_{max}$, or alternatively at an intermediate stage in the grinding cycle, where L has a convenient value less than $L_{max}$ the rotation of the camshaft can be halted at a preset position within reasonable accuracy, to allow the information of a gauge probe to determine and correct the size of at least one of the ground cam profiles by some suitable means or to allow the workpiece to be easily removed from the grinding machine. Means may also be provided for checking the profile of any individual cam after grinding, preferably using the memory to store the appropriate cam profile data related to the value of $\theta$, perhaps using conventional lift formulae.

By means of suitable mechanical linkages, it is possible to use the motor to produce the longitudinal movement of the table 13 relative to the wheelhead between the grinding of adjacent cam blanks on the workpiece, as well as to rotate the workpiece during grinding. Alternatively, a separate motor controlled by the same control system can be used to perform this function, using suitable feedback means for determining the location of the table i.e. the value of L relative to the predetermined linear camshaft datum 23 to a sufficient degree of accuracy.

It will be apparent that if at least some of the cam profiles ground on each cam blank of the workpiece are different so that each one has to be programmed and ground independently, a similar control system to that of FIG. 7 can be used, the only different being that the memory would carry several speed programmes, one for each different cam profile, and would identify them by the value of L, the axial displacement from the linear camshaft datum. Once the correct profile is identified, the memory could easily supply the initial values of $\theta_D$, $\dot{\theta}$, $\ddot{\theta}$ and the change angle and the control system would operate as described above. Clearly, the same system could be used in the grinding of a single cam profile on a workpiece, except that in such case, the worktable position would not vary, i.e. the value of L would not change once the grinding cycle has begun, and it may not be necessary to enter the cam angle into the angle counter if the cam datum and workpiece datum (corresponding to the camshaft datum in the illustrated embodiment) coincide.

We claim:

1. A method of machining a cam profile on a workpiece comprising the steps of rotating the workpiece adjacent to a machine tool, producing movement of the workpiece relative to the machine tool in a lateral direction with respect to the axis of rotation of the workpiece so that the machine tool removes stock from the workpiece to form a predetermined cam profile thereon, continuously monitoring the angular displacement of the workpiece relative to a datum during formation of said cam profile, pre-programming a memory with a speed programme relating different rotational speeds of the workpiece for a substantially constant stock removal rate to a number of individual angular displacements of the workpiece from said datum, pre-programming a memory with acceleration data relating to the changes of speed required by said speed programme at the different angular positions of the workpiece and, once machining of the workpiece has commenced, continuously measuring the angular displacement of the workpiece from said datum and, at the selected angular displacements at which a change of rotational speed is dictated by said speed programme, adjusting the speed of rotation of the workpiece to the speed determined by the speed programme and at an acceleration determined by the acceleration programme and maintaining the workpiece at the new speed until the new angular displacement from said datum dictates the next change in rotational speed of the workpiece, and repeating this process until the predetermined cam profile is formed on the workpiece.

2. A method as claimed in claim 1, in which the instantaneous angular disposition of the workpiece is maintained by the production of a pulse signal everytime the workpiece rotates through a predetermined increment, each such pulse signal being accumulated in an angle counter of which the output is indicative of the actual instantaneous angular displacement, the output being compared to change angle count data representing the angular displacement at which the next change in rotational speed occurs, according to the speed programme, the change angle count data being updated after each change in rotational speed of the workpiece has been initiated.

3. A method as claimed in claim 1 or claim 2, in which at the start of the machining operation, the workpiece is rotated at an arbitrary speed by the loading of a speed counter with a count representing the arbitrary initial speed, the output of the speed counter being supplied to drive means for rotating the workpiece via a digital to analogue converter, the output of the speed counter being compared to count data representative of the new rotational speed when the speed programme dictates a change in rotational speed is required, and the content of the speed counter being altered to equal the new rotational speed count data thereby to change the rotational speed of the workpiece correspondingly.

4. A method as claimed in claim 3, in which the rate of change of the contents of the speed counter is controlled using said acceleration data supplied by the speed programme.

5. A method as claimed in claim 4, in which the acceleration data is supplied in the form of an acceleration count to an acceleration latch each time the memory is searched for new rotational speed data, the output of the acceleration latch being used to divide a series of clock pulses to produce a control signal for controlling the rate of input of data into, and hence alteration of the contents of, the speed counter.

6. A method as claimed in claim 1, in which an elongate workpiece is mounted for rotation adjacent the machine tool, the workpiece being indexed longitudinally to bring successive portions thereof in turn into lateral registration with said machine tool, the workpiece being rotated after each indexing movement for the machining as aforesaid of a respective predetermined cam profile on the workpiece portion in registration with the machine tool at that time.

7. A method as claimed in claim 6, comprising the further steps of pre-programming a memory with a speed programme relating the rotational speed required for a substantially constant stock removal rate to the angular displacement of the workpiece from said datum, and, once machining of the workpiece has commenced, noting the angular displacement from said datum at which a change of rotational speed is dictated by said speed programme, referring back to the memory for data regarding the new rotational speed when this noted angular displacement is reached by the workpiece, altering the rotational speed of the workpiece and noting the next angular displacement from said datum at which the speed programme dictates the next change in rotational speed should occur, and repeating this process until the respective predetermined cam profile is formed on the workpiece, the memory being also pre-programmed with information relating the longitudinal displacement relative to a linear datum of each portion of the workpiece on which a cam profile is to be machined to a particular speed programme associated with that cam profile so that at the start of each machining operation the correct speed programme for the cam profile to be machined can be identified.

8. A method as claimed in claim 7, in which at the start of each machining operation, the workpiece is rotated at an arbitrary speed by the loading of a speed counter with a count representing the arbitrary initial speed, the output of the speed counter being supplied to drive means for rotating the workpiece via a digital to analogue converter, the output of the speed counter being compared to count data representative of the new rotational speed when the respective speed programme dictates a change in rotational speed is required, the content of the speed counter being altered to equal the new rotational speed count data thereby to change the rotational speed of the workpiece correspondingly, and in which the same speed programme is used in the machining of a plurality of cam profiles on a workpiece, the cam profiles each having the same shape but respective cam angles, i.e. the angles between the respective cam data and an angular workpiece datum, in which the memory is pre-programmed with information relating the cam angle for each cam profile to be machined to the respective longitudinal displacement from said linear datum of the workpiece portion on which the cam profile is to be machined, and in which the machining of a cam profile on a workpiece portion commences when the angular displacement of the workpiece relative to its angular datum is zero, at which time the respective cam angle is identified and entered into the angle counter to constitute the instantaneous angular displacement of the cam profile to be machined to the cam datum of that cam profile.

9. A method as claimed in claim 1, in which the machine tool is a grinding wheel which is rotated during the grinding of a cam profile.

* * * * *